United States Patent Office 3,514,492
Patented May 26, 1970

3,514,492
DEHYDROGENATION CATALYST AND A PROCESS FOR DEHYDROGENATING CYCLIC ALCOHOLS AND KETONES
Bernard Juguin, Rueil-Malmaison, Jean Miquel, Paris, and Jean François Le Page, Rueil-Malmaison, France, assignors to Institut Francais du Petrole, Rueil-Malmaison, France
No Drawing. Filed Dec. 28, 1967, Ser. No. 694,104
Claims priority, application France, Jan. 4, 1967, 89,995
Int. Cl. C07c 39/12; B01j 11/40
U.S. Cl. 260—621        14 Claims

ABSTRACT OF THE DISCLOSURE

A dehydrogenation catalyst useful for dehydrogenating a cyclic alcohol or ketone to the corresponding phenol is prepared by impregnating a silica having a specific surface of 100 to 300 m.$^2$/g. and a porous volume of 0.7 to 1.3 cm.$^3$/g. and having a content of 0.4 to 5% by weight, expressed as Na$_2$O, of at least one alkali metal as a free base, said catalyst containing nickel in an amount of 10–25% of the weight of the catalyst, copper in an amount of 15–50% by weight of the nickel and chromium in an amount of 1–40% by weight of the nickel, with an aqueous solution containing nickel, copper and chromium compounds, subsequently drying the obtained catalyst, roasting the catalyst by heating at a temperature of about 300° to 500° C. and reducing the catalyst under hydrogen at a temperature of about 300° to 500° C.

---

This invention relates to the manufacture of a dehydrogenation catalyst, the resulting catalyst and an improved process for manufacturing phenols by the catalytic dehydrogenation of corresponding cyclic alcohols and/or ketones, for example cyclohexanol, cyclohexanone or their mixtures.

According to the invention, a silica having a surface between 100 and 300 m.$^2$/g., a porous volume between 0.7 and 1.3 cm.$^3$/g. and a content by weight of alkali metal as free base between 0.4 and 5%, expressed as Na$_2$O, is impregnated by means of aqueous solutions of nickel compounds, copper compounds and chromium compounds.

The silica employed is for example in the form of balls, extrudates or other agglomerates.

It is known that phenol is an industrial chemical product of primary importance, and improving the economics of its manufacture has been an objective in the art.

It has been proposed to carry out such a dehydrogenation by passing cyclohexanol and/or cyclohexanone on a catalyst containing nickel, copper, chromium and an alkali metal sulfate deposited on a carrier such as a silica which has been previously made free of alkali or alkaline earth metals contained therein. According to another known process, nickel, copper and chromium are deposited, together with an alkali metal sulfate and nitrate or nitrite, on any inert carrier for example, alumina.

In these two cases, the process is carried out at about 325–450° C. under a pressure of about 0.1–20 kg./cm.$^2$.

Hydrogen may be used in a preferred amount of 0.2–15 moles per mole of cyclohexanol and/or cyclohexanone.

It does not appear, however, that it has been possible to obtain simultaneously, in the presence of catalysts containing non-noble metals:

A very high catalytic activity allowing the use of high spatial velocities, for example, feed rates of cyclohexanol and/or cyclohexanone higher than 0.5 volume per volume of catalyst and per hour, A selective conversion, avoiding the formation of dehydration products on the one part, and condensation or polymerization products on the other part, A high stability, allowing the use of the catalyst on an industrial scale, A great ease of regeneration of the catalyst, particularly by burning the carbon deposits.

The researches which have led to this invention have brought a satisfactory solution to these problems.

The improved process of this invention is based essentially on the use, as a catalytic carrier, of an activated silica containing 0.4–5% and preferably 0.7–2% by weight of alkali metals, expressed as Na$_2$O, as free base.

The alkali metals, as free base, which are present in this silica, may be titrated directly by means of strong acids, for example by means of hydrochloric acid, in the presence of conventional pH indicators, for example, phenolphthalein.

The free base may be of any kind, for example an alkali metal oxide, hydroxide or carbonate, particularly sodium oxide, potassium hydroxide, lithium carbonate, or cesium oxide.

The alkali metal is introduced into the silica at any moment of the latter's manufacture. For example, an oxide, a hydroxide or a salt which may be decomposed by heat, for example a nitrate, nitrite or carbonate, may be introduced into silica, then the latter is heated, for example at about 300–700° C. so as to decompose the salt. According to another preferred process, the silica is manufactured by contacting an acid such as nitric acid with an alkali metal silicate, for example sodium silicate. The resulting silica is washed thereafter with water so as to lower its sodium nitrate content to the desired value. This is followed by calcination, for example at 300–700° C., so as to convert the nitrate to sodium oxide (free base). The resulting activated and basic silica is used thereafter for the impregnation treatment of this invention.

This process also distinguishes from known processes on several preferred, however not obligatory points, among which the following are to be named:

The introduction of alkali metal oxide or hydroxide into the catalyst, after the catalytic elements have been introduced, in order to stabilize the catalyst, The use of silica having a surface between 160 and 220 m.$^2$/g., The use of silica which has been previously activated by heating to temperatures of 300 to 700° C.

The absence of sulfate ions in the catalyst.

Average concentrations of the constituents of the catalyst are given hereafter, which have given satisfactory results, these values being ilustrative and not limitative.

The content by weight of nickel is advantageously between 10 and 25% (preferably between 15 and 20%), that of copper between 15 and 50% (preferably between 25 and 40%) of the nickel content, that of chromium between 1 and 40% (preferably between 20 and 40%) of the nickel content. If an additional alkali metal compound is used, in order to stabilize the catalyst, the amount of the latter, expressed as KOH, is between 0.01 and 0.3 times by weight that of nickel, advantageously between 0.02 and 0.1 times and preferably between 0.04 and 0.06 times this amount.

It is essential that the carrier contain from 0.4 to 5% by weight of alkali metals, expressed as Na$_2$O, before the active elements are introduced therein, since otherwise the selectivity is considerably reduced.

If the carrier contains less than 0.4% of alkali metals, the parasitic dehydration of the alcohol is favored, whereas beyond 5%, the ketone tends to polymerize.

If the carrier contains other alkali metals than sodium, the amount of the former is expressed by the corresponding molar amount of $Na_2$ (for example 94 g. of $K_2O$ correspond to 62 g. of $Na_2O$).

A similar conversion is made if required for the additional alkali metal compound, expressed as KOH.

The active elements Ni, Cu and Cr is deposited on silica by means of solutions which contain the same, for example, solutions of nickel, copper or chromium nitrates. The metals are deposited simultaneously or one after the other.

After the active elements have been introduced, the catalyst is finally dried, roasted by heating to temperatures preferably in the range of from 350 to 500° C., and reduced in a hydrogen current at a temperature preferably between 350 and 500° C., these latter two treatments being either simultaneous or preferably successive.

The best catalysts have been obtained by the use, in the following order, of several operations:

(1) Impregnation of the basically-reacting silica by means of an aqueous solution containing copper nitrate, nickel nitrate and chromium nitrate.

(2) Partial drying, for example, at about 60 to 100° C.

(3) Impregnation by means of an aqueous solution of an alkali metal compound, such as an oxide, hydroxide or carbonate.

(4) Drying, for example at about 100–110° C.

(5) Roasting, for example by heating for 3 to 8 hours in an air current at a temperature of about 300 to 500° C.

(6) Reduction by hydrogen, for example at about 300–500° C., for about 5 to 15 hours, with an hourly hydrogen output of about 250 to 1000 times the volume of the catalyst.

The latter operation is preferably carried out in the dehydrogenation zone itself.

The operative conditions are of importance. In order to obtain high conversion rates and selectivities, the temperature is chosen between 320 and 450° C., and preferably between 380 and 430° C., for hourly volumetric feed rates of liquid cyclohexanol and/or cyclohexanone (V.V.H.) of about 0.3 to 3 times the volume of catalyst, more advantageously between 0.5 and 2, with absolute pressures of 0.5 to 10 kg./cm.$^2$, preferably 1 to 3 kg./cm.$^2$. Since the hydrogen partial pressure is of decisive influence on the stability of these catalysts, the molar ratio (R) hydrogen of cyclohexanol and/or cyclohexanone at the inlet of the reaction vessel, is preferably chosen between 0.5 and 15, advantageously between 1 and 8 and preferably between 2 and 5.

Amongest the alcohols and ketones to which the process may be applied, the following may be named by way of examples: cyclohexanol, cyclohexanone, 3-methylcyclohexanol, 1,2-cyclohexanediol, α-tetralol and 3,5-dimethylcyclohexanone.

The following examples are given by way of illustration, not of limitation.

EXAMPLE 1

Manufacture of a catalyst containing 18% by weight of nickel, 6% by weight of copper, 0.4% by weight of chromium and 1% by weight of potassium hydroxide deposited on silica balls with a basic reaction.

The silica balls are manufactured as follows: silica is precipitated out from an aqueous solution of sodium silicate to which nitric acid is added. The silica is partially washed with water, shaped to balls and roasted at 600° C.

During this roasting, sodium nitrate is decomposed and converted to sodium oxide which may be titrated by means of hydrochloric acid.

The resulting balls exhibit a specific weight of 0.4, a porous volume of 1.2 cm.$^3$/g., a specific surface of 190 m.$^2$/g. and a content by weight of $Na_2O$ of 0.9% (as determined by titration by means of hydrochloric acid, in the presence of phenophthalein).

The following solution is manufactured:

$Ni(NO_3)_2$, $6H_2O$—125 g.
$Cu(NO_3)_2$, $3H_2O$—31.3 g.
$Cr(NO_3)_3$, $9H_2O$—3.75 g.
Distilled water—150 cm.$^3$ After dissolution, the volume is completed to 240 cm.$^3$ by means of distilled water, and two equal parts each of 120 cm.$^3$ are made therefrom. The first 120 cm.$^3$ are used to impregnate 100 g. of the silica balls, and the contact is maintained by 10 hours at the end of which the balls have absorbed these 120 cm.$^3$. The impregnated balls are then dried at 100° C. for 12 hours, and thereafter impregnated by means of the second part of the solution; the contact is maintained for 10 hours and drying is carried out at 100° C. for 12 more hours. The catalyst is thereafter impregnated by means of 105 cm.$^3$ of a solution containing 1.4 g. of KOH, the contact is maintained for 10 hours, then the catalyst is dried at 100° for 12 hours. The catalyst is then roasted in an oven at 420° C. for 5 hours in a nitrogen current of 50 liters per hour. After cooling, the catalyst is transferred into the dehydrogenation vessel where it is reduced for 12 hours at 400–420° C., in a hydrogen stream of 50 liters per hour.

This results into catalyst A.

EXAMPLE 1B

By way of comparison, a second catalyst is manufactured, starting with silica balls manufactured as in Example 1 (however with a complete washing of silica in order to wash away the sodium compounds). Sodium nitrate is introduced into the impregnating solution which contains the salts of Ni, Cu and Cr.

There is obtained a catalyst B with the same global composition as catalyst A, except that sodium as basic compound was missing when the catalytic metals were introduced.

EXAMPLE 2

Catalysts A and B are used for dehydrogenating cyclohexanol, in the following conditions:

$T=400°$ C.; $P=1$ atm.; R (as hereinbefore defined)=2; D (liquid cyclohexanol feed rate)=1 liter per liter of catalyst and per hour.

The following results were obtained:

|  | Percent conversion rate | Percent selectivity to phenol |
|---|---|---|
| Catalyst A | 98.5 | 99 |
| Catalyst B | 98.5 | 96 |

EXAMPLE 3

This example shows the influence of the chromium content on the stability of the catalyst.

Using the method of Example 1, however without use of KOH, five catalysts C, D, E, F, G are manufactured with 18% content by weight of nickel, 6% of copper and various contents of chromium.

Catalyst: Content of chromium, percent
C _____ 0.4
D _____ 1
E _____ 2.5
F _____ 5
G _____ 10

The textural characteristics of the silica balls are those of Example 1. The roasting temperature was 420° C. for the 5 catalysts, as well as the reduction temperature.

These 5 catalysts were used to treat cyclohexanol in the following conditions:

$T=420°$ C.; $P=2$ atm.; $D=2$; $R=2$.

The results are given in Table I.

TABLE I

| Catalyst | Time (hours) | Percent conversion rate | Percent selectivity to phenol |
|---|---|---|---|
| C | 0 | 98.2 | 98.2 |
|   | 30 | 84.5 | 98.8 |
| D | 0 | 98.7 | 97.5 |
|   | 30 | 88.1 | 98.8 |
| E | 0 | 98.8 | 98.2 |
|   | 30 | 90.7 | 98.6 |
| F | 0 | 99 | 98 |
|   | 30 | 94.8 | 98.5 |
| G | 0 | 99.3 | 94 |
|   | 30 | 96.5 | 92.3 |

It may be deduced therefrom that the amount of chromium is of decisive influence on the stability of these catalysts, and that the stability increases with the amount of chromium. However beyond 5% by weight of chromium, this increase of stability goes together with a reduction of selectivity since the catalyst tends to become dehydrating. There is thus a maximal amount which should preferably not be surpassed; the optimal amount of chromium is between 0.22 and 0.33 times that of nickel.

EXAMPLE 4

This example shows the influence of the amount of basic agent in the catalytic carrier, on the activity, selectivity and stability of the catalyst.

Operating as in Example 1, however without introduction of KOH, 3 catalysts H, I, J, are manufactured, all containing 18% by weight of nickel, 6% by weight of copper and 2.5% by weight of chromium deposited on silica balls with the same specific surface (145 m.$^2$/g.), the same total porous volume (95 to 100 ccm. per 100 grams), except that the content of Na$_2$O is varied:

Catalyst: Na$_2$O, percent
H _____ 0.15
I _____ 0.5
J _____ 0.9

A fourth catalyst (K) is also prepared, containing 18% (by weight) of nickel, 6% of copper and 2.5% of chromium on the silica carrier containing 0.15% by weight of Na$_2$O; 5% by weight of potassium carbonate is also added (after the impregnation with the metallic elements).

These 4 catalysts have been used with cyclohexanol, under the operating conditions of Example 3. The results are given in Table II.

TABLE II

| Catalyst | Time (hours) | Percent conversion rate | Percent selectivity to phenol |
|---|---|---|---|
| H | 0 | 98.6 | 81 |
|   | 6 | 87.9 | <81 |
| I | 0 | 97.9 | 94.3 |
|   | 6 | 87.2 | 93.7 |
| J | 0 | 96.9 | 99.3 |
|   | 6 | 90.7 | 99.6 |
| K | 0 | 69.2 | 99.5 |
|   | 6 | 62.5 | 99.5 |

It may be observed that:
The stability is substantially the same for all catalysts;
The selectivity of catalyst I is moderate, and that of catalyst H very bad;
The neutralization of catalyst K after impregnation considerably reduces the activity of the catalyst, which shows that it is not equivalent to have the alkali metal in the carrier before impregnation or to introduce it after impregnation.

Thus the inertness of the catalytic carrier is of major importance, and it is necessary to use a carrier which is sufficiently basic from the start if a catalyst both active and selective is desired.

EXAMPLE 5

This example shows the influence of the specific surface of the carrier on the stability of the catalyst.

Three catalysts without potash, L, M, N, are manufactured, containing 18% (by weight) of nickel, 6% of copper and 5% of chromium on silica balls containing 0.9% by weight of Na$_2$O, the specific surfaces being however varied:

Catalyst: m.$^2$/g.
L _____ 45
M _____ 190
N _____ 290

The porous volumes are comprised between 1 and 1.1 cm.$^3$/g.

These 3 catalysts have been tested with cyclohexanol under the operating conditions of Example 3. The results are given in Table III.

TABLE III

| Catalyst | Time (hours) | Percent conversion rate | Percent selectivity to phenol |
|---|---|---|---|
| L | 0 | 98 | 99 |
|   | 15 | 87.5 | 99.3 |
| M | 0 | 99 | 98 |
|   | 30 | 94.8 | 98.5 |
| N | 0 | 99.3 | 97.8 |
|   | 30 | 91.2 | 98.5 |

The higher stability of catalyst M may be observed; thus the specific surface is of importance. The best stabilities are obtained for specific surfaces of silica between 160 and 220 m.$^2$/g.

EXAMPLE 6

This example shows the influence of the alkali metal compounds, introduced after the catalytic metals, on the stability of the catalyst.

Three catalysts are manufactured, O, P, Q, containing 18% (by weight) nickel, 6% copper and 5% chromium on the same silica balls as in Example 1, following the operating method of this example. On these catalysts, varied amounts of potash are deposited:

Catalyst: Percent by weight
O _____ 0.5
P _____ 1
Q _____ 2

These catalysts have been tested with cyclohexanol, under the conditions of Example 3, and their performances were compared with those of catalyst M (without potash) of Example 5. The results are given in Table IV.

It is to be observed that the introduction of alkali metal compounds after the impregnation with the catalytic metals is of appreciable importance on the stability of the catalyst. However beyond 1% by weight of potash, the stability does not increase whereas the catalytic activity decreases.

TABLE IV

| Catalyst | Time (hours) | Percent conversion rate | Percent selectivity to phenol |
|---|---|---|---|
| M | 0 | 99 | 98 |
|   | 30 | 94.8 | 98.5 |
| O | 0 | 99 | 97.5 |
|   | 30 | 96.7 | 98.9 |
| P | 0 | 98.9 | 97.5 |
|   | 30 | 97.7 | 99 |
| Q | 0 | 98.1 | 97.8 |
|   | 30 | 97 | 98.9 |

The optimal amount of alkali metal compound is thus about 4 to 7% by weight of the amount of nickel.

EXAMPLE 7

Catalyst P of Example 6 is used to dehydrogenate cyclohexanol under the following conditions:
$T=390°$ C.; $P$ absolute$=2$kg./cm.$^2$; $R=2$; $D=0.8$.

At the beginning the composition by weight of the product issuing from the reaction zone was as follows:

Percent
Cyclohexanol _____ 0.2
Cyclohexanone _____ 1.6
Hydrocarbons _____ 1.6
Water _____ 0.4
Phenol _____ 96.2 corresponding to a conversion rate of 98.2% and a selectivity to phenol of 98%.

After 350 hours, these values were:

| | Percent |
|---|---|
| Cyclohexanol | 0.3 |
| Cyclohexanone | 4.7 |
| Hydrocarbons | 0.8 |
| Water | 0.2 |
| Phenol | 94 | i.e. a conversion rate of 95% and a selectivity to phenol of 99%.

The catalyst was then regenerated by a mixture of nitrogen-air as follows:

Initial temperature—400° C.
Regeneration time—8 hours
100 liters of a mixture of air-nitrogen per liter of catalyst per hour.

After this regeneration of the catalyst, the latter was used in the same operating conditions, with the same amount of cyclohexanol. The obtained product had the following composition by weight:

| | Percent |
|---|---|
| Cyclohexanol | 0.2 |
| Cyclohexanone | 1.8 |
| Hydrocarbons | 1.2 |
| Water | 0.3 |
| Phenol | 96.5 | i.e. a conversion rate of 98% with a selectivity to phenol of 98.5%.

These catalysts are thus perfectly regenerable.

EXAMPLE 8

Example 1 is repeated, however with modified proportions of metals: 14% (by weight) of nickel, 4.5% of copper, 1% of chromium and 0.5% of potash (KOH).

Under the conditions of Example 3, a mixture of 90% cyclohexanol with 10% by weight of cyclohexanone was treated. The conversion rate was 97% and the selectivity to phenol 98.8%.

What is claimed is:

1. In a process for manufacturing a dehydrogenation catalyst comprising impregnating silica with an aqueous solution which contains nickel, copper and chromium compounds, subsequently drying the obtained catalyst, roasting the catalyst by heating at a temperature of about 300° to 500° C. and reducing the catalyst under hydrogen at a temperature of about 300° to 500° C., the improvement which comprises impregnating a silica having a specific surface of 160 to 220 m.$^2$/g. and a porous volume of 0.7 to 1.3 cm.$^3$/g. and having a content of 0.4 to 5% by weight, expressed as Na$_2$O, of at least one alkali metal as a free base, said catalyst containing nickel in an amount of 10–25% of the weight of the catalyst, copper in an amount of 15–50% by weight of the nickel and chromium in an amount of 1–40% by weight of the nickel.

2. Process according to claim 1, wherein the catalyst is substantially free of sulfate ions.

3. Process according to claim 1, wherein the amount of alkali metal is from 0.7 to 2% by weight.

4. Process according to claim 1, wherein the silica has been previously activated by heating to 300–700° C.

5. Process according to claim 1, wherein the nickel comprises 15–20% of the weight of the catalyst, the copper 25 to 40% of the weight of the nickel and the chromium 20 to 40% of the weight of the nickel.

6. Process according to claim 1, wherein impregnation with nickel, copper and chromium is followed by the introduction of an alkali metal oxide or hydroxide, in a proportion, expressed as the weight of KOH, corresponding to 0.01–0.3 times the proportion of nickel.

7. Process according to claim 6, wherein the alkali metal oxide or hydroxide comprises 0.02–0.1 times the amount by weight of the nickel.

8. Process according to claim 1, wherein the alkali metal is present in the form of an oxide, a hydroxide or a carbonate.

9. A dehydrogenation catalyst prepared by impregnating a silica having a specific surface of 160 to 220 m.$^2$/g. and a porous volume of 0.7 to 1.3 cm.$^3$/g. and having a content of 0.4 to 5% by weight, expressed as Na$_2$O, of at least one alkali metal as a free base, said catalyst containing nickel in an amount of 10–25% of the weight of the catalyst, copper in an amount of 15–50% by weight of the nickel and chromium in an amount of 1–40% by weight of the nickel, with an aqueous solution containing nickel, copper and chromium compounds, subsequently drying the obtained catalyst, roasting the catalyst by heating at a temperature of about 300° to 500° C. and reducing the catalyst under hydrogen at a temperature of about 300° to 500° C.

10. A dehydrogenation catalyst according to claim 9, wherein the silica has been previously activated by heating to 300–700° C.

11. A dehydrogenation catalyst according to claim 9, wherein the impregnation with nickel, copper and chromium is followed by the introduction of an alkali metal oxide or hydroxide, in a proportion, expressed as the weight of KOH, corresponding to 0.01–0.3 times the proportion of nickel.

12. A process for dehydrogenating a cyclic alcohol or ketone to the corresponding phenol which comprises treating said alcohol or ketone with hydrogen at a temperature of 320° to 450° C. in the presence of a dehydrogenation catalyst prepared by impregnating a silica having a specific surface of 160 to 220 m.$^2$/g. and a porous volume of 0.7 to 1.3 cm.$^3$/g. and having a content of 0.4 to 5% by weight, expressed as Na$_2$O, of at least one alkali metal as a free base, said catalyst containing nickel in an amount of 10–25% of the weight of the catalyst, copper in an amount of 15–50% by weight of the nickel and chromium in an amount of 1–40% by weight of the nickel, with an aqueous solution containing nickel, copper and chromium compounds, subsequently drying the obtained catalyst, roasting the catalyst by heating at a temperature of about 300° to 500° C. and reducing the catalyst under hydrogen at a temperature of about 300° to 500° C.

13. A process according to claim 12, wherein the hourly volumetric feed rate of alcohol or ketone is about 0.3 to 3 times the volume of said catalyst.

14. A process according to claim 13, wherein the treatment with hydrogen is carried out under absolute pressure of 0.5 to 10 kg./cm.$^2$, the molar ratio of hydrogen to alcohol or ketone at the inlet of the reaction vessel being 0.5 to 15.

References Cited

UNITED STATES PATENTS

| 2,973,371 | 2/1961 | Chomitz et al. | 252—451 X |
| 3,336,399 | 8/1967 | Gac et al. | 260—621 |
| 3,340,311 | 9/1967 | Chitwood et al. | 260—621 |
| 3,356,743 | 12/1967 | Freure | 260—621 |

DANIEL E. WYMAN, Primary Examiner

C. F. DEES, Assistant Examiner

U.S. Cl. X.R.

252—454